United States Patent
Wölfle

(10) Patent No.: US 10,906,681 B2
(45) Date of Patent: Feb. 2, 2021

(54) PACKAGING MACHINE WITH HINGED PROTECTIVE COVER

(71) Applicant: Multivac Sepp Haggenmüller SE & Co. KG, Wolfertschwenden (DE)

(72) Inventor: Manuel Wölfle, Lauben (DE)

(73) Assignee: MULTIVAC SEPP HAGGENMUELLER SE & CO. KG, Wolfertschwenden (DE)

(*) Notice: Subject to any disclaimer, the term of this patent is extended or adjusted under 35 U.S.C. 154(b) by 132 days.

(21) Appl. No.: 16/202,160

(22) Filed: Nov. 28, 2018

(65) Prior Publication Data

US 2019/0161226 A1    May 30, 2019

(30) Foreign Application Priority Data

Nov. 30, 2017    (DE) .................. 10 2017 128 363

(51) Int. Cl.
| | | |
|---|---|---|
| B65B 57/00 | (2006.01) | |
| F16P 1/02 | (2006.01) | |
| B65B 59/04 | (2006.01) | |

(52) U.S. Cl.
CPC ............ B65B 57/005 (2013.01); B65B 59/04 (2013.01); F16P 1/02 (2013.01)

(58) Field of Classification Search
CPC ........... B65B 57/005; B65B 59/04; F16P 1/02
See application file for complete search history.

(56) References Cited

U.S. PATENT DOCUMENTS

| | | | | |
|---|---|---|---|---|
| 2,201,244 A | * | 5/1940 | Root .................... | F16P 3/04 425/152 |
| 2,338,477 A | * | 1/1944 | Wolters ................. | A47B 63/00 220/812 |
| 2,655,067 A | * | 10/1953 | Bechler ................. | B23Q 11/08 82/152 |
| 2,867,064 A | * | 1/1959 | Hermansson ............ | F16P 1/02 451/455 |
| 3,204,499 A | * | 9/1965 | Schoenrock ........ | B23Q 11/0891 82/152 |

(Continued)

FOREIGN PATENT DOCUMENTS

| | | |
|---|---|---|
| DE | 3511953 A1 | 10/1986 |
| DE | 102008053665 A1 | 5/2010 |

(Continued)

*Primary Examiner* — Nathaniel C Chukwurah
*Assistant Examiner* — Lucas E. A. Palmer
(74) *Attorney, Agent, or Firm* — Brooks Kushman P.C.

(57) ABSTRACT

A packaging machine comprising a machine frame, an area of protection and a protective cover. The protective cover, when disposed at a protective position, shields the area of protection at least partially against access from outside the packaging machine. The protective cover may be fully removable from the machine frame as well as lockable on the latter at an access position. The protective cover, when occupying its access position, allows access to the area of protection of the packaging machine. The machine frame may have a locking lever arranged thereon, wherein the locking lever is configured for retaining the protective cover at the access position. The locking lever may extend through an opening in a wall of the protective cover when the protective cover is disposed at its access position.

20 Claims, 5 Drawing Sheets

(56) References Cited

U.S. PATENT DOCUMENTS

| | | | | | |
|---|---|---|---|---|---|
| 3,230,869 | A | * | 1/1966 | Wilkins | B30B 15/028 100/214 |
| 3,343,332 | A | * | 9/1967 | Mahaffy | B65B 9/04 53/433 |
| 3,397,508 | A | * | 8/1968 | Stroop | B29C 66/91213 53/559 |
| 3,474,494 | A | * | 10/1969 | Damm | B29C 33/305 425/116 |
| 3,633,041 | A | * | 1/1972 | Koskela | D06F 37/42 307/119 |
| 3,693,318 | A | * | 9/1972 | Balzer | B65B 7/164 53/329.3 |
| 3,851,445 | A | * | 12/1974 | Schuh | B65B 7/164 53/329 |
| D246,108 | S | * | 10/1977 | Ashworth | D15/124 |
| 4,105,903 | A | * | 8/1978 | Shaw | B04B 7/06 210/146 |
| 4,162,878 | A | * | 7/1979 | Puglisi | B29C 45/84 425/151 |
| 4,168,598 | A | * | 9/1979 | Omori | B65B 31/021 53/433 |
| 5,280,975 | A | * | 1/1994 | Tscheu | B04B 7/06 292/157 |
| 5,619,110 | A | * | 4/1997 | Sugimoto | F16P 3/08 318/450 |
| 5,822,956 | A | * | 10/1998 | Liechti | B65B 7/164 53/510 |
| 5,949,039 | A | * | 9/1999 | Koek | H01H 9/287 200/43.13 |
| 6,067,877 | A | * | 5/2000 | Kato | B23Q 5/34 74/608 |
| 6,085,497 | A | * | 7/2000 | Natterer | B65B 65/02 53/373.7 |
| 6,602,178 | B2 | * | 8/2003 | Inaniwa | B04B 7/06 494/12 |
| 6,796,206 | B2 | * | 9/2004 | Li | B23Q 11/0891 82/117 |
| 8,601,906 | B2 | * | 12/2013 | Nishi | B23Q 11/0891 409/134 |
| 9,592,557 | B2 | * | 3/2017 | Gardner | B23B 25/04 |
| 10,660,422 | B2 | * | 5/2020 | Dourlens | B65B 63/08 |
| 2005/0150506 | A1 | * | 7/2005 | Draghetti | B65B 19/02 131/280 |
| 2006/0231211 | A1 | * | 10/2006 | Chou | B29C 66/8618 156/579 |
| 2011/0168517 | A1 | * | 7/2011 | Krieger | E05C 3/14 192/135 |
| 2011/0214579 | A1 | * | 9/2011 | Millett | B65B 63/02 100/29 |
| 2012/0012013 | A1 | * | 1/2012 | Giett | B65B 63/02 100/29 |
| 2012/0291399 | A1 | * | 11/2012 | Bonneville | B65B 47/04 53/203 |
| 2012/0291400 | A1 | * | 11/2012 | Ehrmann | B29C 33/34 53/396 |
| 2014/0182246 | A1 | * | 7/2014 | Gabler | B65B 57/005 53/396 |
| 2015/0083553 | A1 | * | 3/2015 | Gabler | B65G 21/06 198/832 |
| 2015/0338021 | A1 | * | 11/2015 | Beaudoin | B30B 9/3014 100/349 |
| 2016/0143416 | A1 | * | 5/2016 | Dourlens | A45D 34/00 53/440 |
| 2016/0201849 | A1 | * | 7/2016 | Gollek | F16P 1/02 160/229.1 |
| 2017/0210497 | A1 | * | 7/2017 | Ravazzini | B65B 59/04 |
| 2017/0320714 | A1 | * | 11/2017 | Brunner | B65B 59/04 |
| 2019/0152638 | A1 | * | 5/2019 | Nakamura | B65B 51/26 |
| 2019/0169895 | A1 | * | 6/2019 | Canaday | H02B 1/14 |

FOREIGN PATENT DOCUMENTS

| | | |
|---|---|---|
| DE | 102016214417 A1 | 2/2018 |
| EP | 2749499 A1 | 7/2014 |
| EP | 3191371 A1 | 7/2017 |

* cited by examiner

PACKAGING MACHINE WITH HINGED PROTECTIVE COVER

CROSS-REFERENCE TO RELATED APPLICATIONS

This Application claims priority to German Patent Application No. 10 2017 128 363.3 filed on Nov. 30, 2017 to Manuel Wölfle, currently pending, the entire disclosure of which is incorporated herein by reference.

FIELD OF THE INVENTION

The present invention relates to a packaging machine comprising a machine frame and a hinged protective cover.

BACKGROUND OF THE INVENTION

To ensure safe production, protective covers, which can prevent operators from reaching into the production flow, have hitherto been used on a packaging machine, in particular on a thermoform packaging machine or on a tray sealer, along a production line, e.g. upstream or downstream of a forming and/or sealing station. Up to now, solutions have been known, in the case of which the protective covers are loosely placed on top of the machine frame. For providing access to the packaging machine, e.g. for the purpose of cleaning and/or maintenance, the protective covers are simply removed.

For reasons of hygiene, removed protective covers should not be placed on the floor. Therefore, it is known e.g. from the post-published DE 10 2017 106 898.8, to configure the protective covers such that they can be stacked and to thus provide a predetermined stowing place. From EP 2 749 499 A1 it is known to move a protective cover to an open position, at which it is held on a tray sealer.

SUMMARY OF THE INVENTION

It is an object of the present invention to provide a packaging machine, which comprises a protective cover and which is improved especially as regards the ease of operation, thorough cleaning and/or a cost-effective structural design. According to the present invention, this object is achieved by a packaging machine having the features of claim 1. Advantageous further developments are specified in the dependent claims.

The present invention relates to a packaging machine comprising a machine frame, an area of protection and a protective cover, which, at a protective position, shields the area of protection against access from outside the packaging machine, wherein the protective cover may be fully removable from the machine frame, in particular without making use of a tool, as well as lockable on the machine frame at an access position of the protective cover, and wherein the protective cover, when occupying the access position, allows access to the area of protection of the packaging machine. The invention may be characterized in that the machine frame has arranged thereon a locking lever, which may be configured for retaining the protective cover at the access position, the locking lever extending through an opening in a wall of the protective cover, when the protective cover may be arranged at the access position.

The machine frame may here be understood as a supporting structure, which arranges and holds various components of the packaging machine in a desired geometric relation to one another. In particular, the protective cover or one or more parts of the protective cover may rest on the machine frame or may be held by the latter. An area of protection may be understood as an area that may be enclosed, at least partially, by the protective cover at the protective position In particular, these may be areas in which packaging films and/or packages to be processed and/or to be filled may be conveyed. In addition, areas in which conveyors, e.g. conveyor chains, run may be defined as areas of protection.

An area of protection need not be fully enclosed by the protective cover. For example, it may, also be partially shielded against access from outside the packaging machine by the machine frame or other components of the packaging machine. The area of protection may here be defined especially relative to the machine frame, i.e. the area of protection will be shielded, at least partially, by the protective cover only in the protective position. By arranging the protective cover at the access position, the protective cover can be moved away from the area of protection and in particular expose the latter.

Protective covers may be understood as components which are provided on the packaging machine and/or on a machine frame of the latter and which cover certain areas of the packaging machine from above and/or from the side, such as protective hoods or side covers. Insert templates, which facilitate the filling of the packages produced, may also be regarded as protective covers in the sense of the present invention.

It will be advantageous when the locking lever may be arranged fully outside the area of protection. This can provide for improved hygiene, among other things.

According to a particularly preferred variant, the locking lever can be operated from both an inner side and an outer side of the protective cover, when the protective cover may be arranged at the access position. The terms inner side and outer side may be understood in the way that has already been explained above. Such a variant has the advantage that releasing the locking lever and moving the protective cover to the protective position can be executed from both sides. This can avoid the necessity of walking around the entire packaging machine or around parts of the latter.

In addition, it may be conceivable that the protective cover can be moved from the protective position to the access position by a pivotal movement about an axis. Such a movement can allow an intuitive and, making use of leverage effects, smooth operation.

According to a particularly advantageous embodiment, the axis extends substantially parallel to a production direction of the packaging machine. In this way, the area of protection can be exposed particularly easily, especially when the machines may be comparatively long and when several protective covers may be arranged in succession. The production direction may here be understood as the direction in which the packages and/or the raw materials, which the packaging machine processes into packages, move and may be subjected to the various processing steps.

The present invention may be particularly advantageous in a variant, in which a plurality of protective covers may be arranged in succession. The term "in succession" in this case is understood in relation to the production direction. In particular, a protective cover and a further protective cover arranged downstream thereof can be regarded as being arranged in succession. Successively arranged protective covers may preferably follow one another without any gaps, i.e. that a distance of e.g. not more than 8 mm, measured in the production direction, may be provided between successively arranged protective covers. The present invention is particularly advantageous in a variant, in which a plurality of protective covers may be arranged in succession along a production direction.

It will be particularly advantageous when the plurality of protective covers may be pivotable about a common axis. In this way, collisions between the protective covers during pivoting can be pre-vented. This may be advantageous in particular in the case of successively arranged protective covers.

According to a further variant, the locking lever may be pivotably supported on the machine frame. The lever can thus be operated more easily, e.g. by preventing chocking or by eliminating such chocking more easily. As will be explained hereinafter, a release function can also be provided in this way.

It may be conceivable that the locking lever has a locking opening, which may be configured for engagement with a projection that extends into the opening, the protective cover being retained at the access position through the engagement between the locking opening and the locking projection. This kind of configuration combines a simple production of the respective components with improved hygiene, accomplished by simple cleaning, and safe locking.

It will be advantageous when a first portion of the locking lever, which extends on an inner side of the protective cover at the access position, has a first width that may be smaller than a second width of a second portion of the locking lever, which extends, at least partially, preferably predominantly, on an outer side of the protective cover at the access position. The transition between the first portion of the locking lever and the second portion of the locking lever may e.g. be step-shaped. Irrespectively of the shape of the transition, it may indicate an intended end position, e.g. the access position.

The side of the protective cover, which may be understood as inner side, may be the side directed towards the area of protection at the protective position. The side of the protective cover, which may be to be understood as outer side, may be the side directed towards the outside of the packaging machine at the protective position. Both the inner side and the outer side may be defined relative to the protective cover, so that the inner side will e.g. be directed only partially towards the area of protection at the access position.

According to a further variant, the opening may comprise a first opening section and a second opening section, the first opening section having a first internal width, which may be smaller than a second internal width of the second opening section. Especially in combination with the portions of the locking lever, one or a plurality of stops can thus be provided between the opening and the locking lever.

According to a particularly advantageous embodiment, the first width of the first portion of the locking lever may be smaller than the first internal width of the first opening section of the opening and the second width of the second portion of the locking lever may be larger than the first internal width of the first opening section of the opening. In this way, the first portion of the locking lever can be passed through the first opening section of the opening until the movement may be blocked by the second portion of the locking lever, whereby an end position or an intermediate position may be indicated.

It may be conceivable that the locking opening of the locking lever may be arranged, preferably fully arranged within the first portion of the locking lever. According to a particularly preferred configuration, the locking opening of the locking lever may be in alignment with the projection, when the second portion of the locking lever strikes against the edge of the opening. In this way, it can be guaranteed that the projection will enter into engagement with the locking opening.

According to a further advantageous variant, the second internal width of the second section of the opening may be larger than the second width of the second portion of the locking lever. This can prevent an unintentional release of the engagement between the locking opening and the projection when this engagement has taken place.

It is conceivable in one embodiment that a length of the projection is larger than a length of the second opening section. The terms length and width can here be understood such that these values may be measured at right angles to one another. This applies to all of the widths and lengths mentioned at all the components.

Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
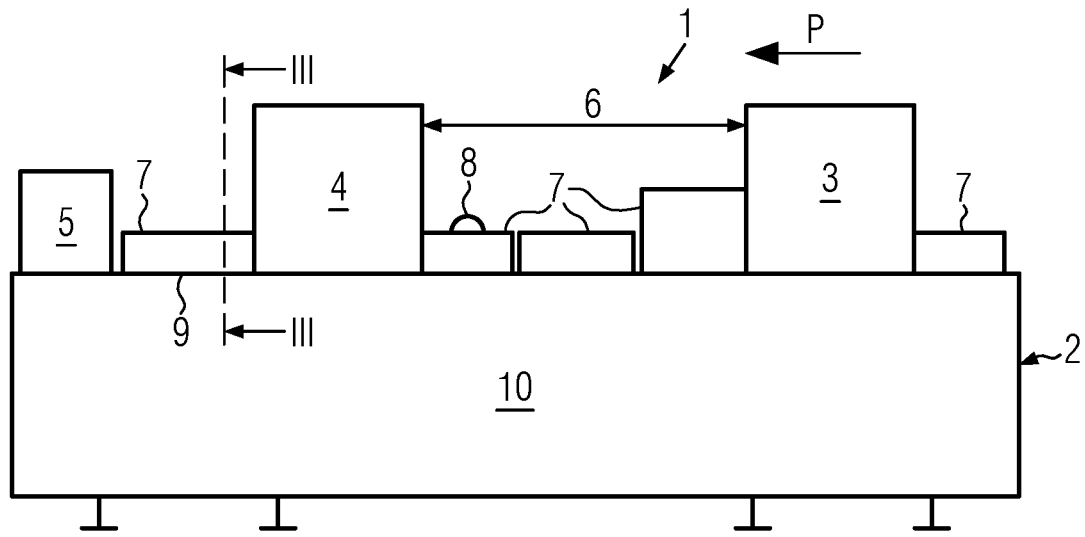
FIG. 1 is a schematic side view of one embodiment of a packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows schematically a side view of an operating side of a packaging machine 1 according to the present invention, which is configured as a thermoform packaging machine in the present embodiment. The packaging machine 1 may comprise a machine frame 2, a forming station 3, a sealing station 4 and a cutting station 5. The forming station 3 may form troughs in a bottom film/foil, which is not shown in detail. Along an infeed line 6, the troughs of the bottom film may be filled with products. At the sealing station 4, a cover film, which is not shown in detail, may be sealed onto the bottom film. This may be done after the trough interior has been evacuated and/or flushed with gas, e.g. for increasing the shelf life of food. The packages formed in the combination of bottom film and cover film may be separated from one another at the cutting station 5 and mechanically conveyed out of the packaging machine 1 or manually removed therefrom.

During operation, certain areas, e.g. directly upstream or downstream of the forming station 3, the sealing station 4 and/or the cutting station 5, must be protected against operators reaching into the respective area from above, so as prevent injuries e.g. when an operator reaches into a lifting mechanism. For this purpose, protective covers 7 may be provided on any sections of the packaging machine 1 where they are necessary or useful, in particular upstream and/or down-stream of the forming station 3 and/or upstream and/or downstream of the sealing station 4. As shown in FIG. 1, also a plurality of protective covers 7 may be arranged in succession, so as to cover e.g. the whole infeed line 6.

For the purpose of maintenance, retooling or cleaning, the protective covers 7, which are loosely placed on the machine frame 2, may be removed from their position. Predominantly for reasons of hygiene, it is, however, not desirable for the protective covers 7 to be placed on the floor next to packaging machine 1. In particular when the packaging machine 1 is cleaned every day, as is usually the case, the protective covers 7 must be removed from or moved away from their protective position, so as to make an area of protection therebelow accessible for cleaning. The protective covers 7 themselves should also be positioned such that they can be cleaned easily.

Depending on the zone to be protected, the protective covers 7 according to FIG. 1 may have different sizes. However, the respective protective covers 7 may be equal in width, when seen in the production direction P. FIG. 1, however, indicates that the respective protective covers 7 may have different depths and/or heights, when seen in the production direction P. Also equally sized protective covers 7 are imaginable.

The protective cover 7 exemplarily positioned in FIG. 1 upstream of the sealing station 4 may have a handle 8, which makes it easier for an operator to lift the protective cover 7. The handle 8 may also be provided on the other protective covers 7 according to FIG. 1. FIG. 1 also shows that the respective protective covers 7 may be placed on an upper surface 9 of a side frame 10 of the packaging machine 1. The side frame 10 may constitute part of the machine frame 2 of the packaging machine 1.

Figure 2:
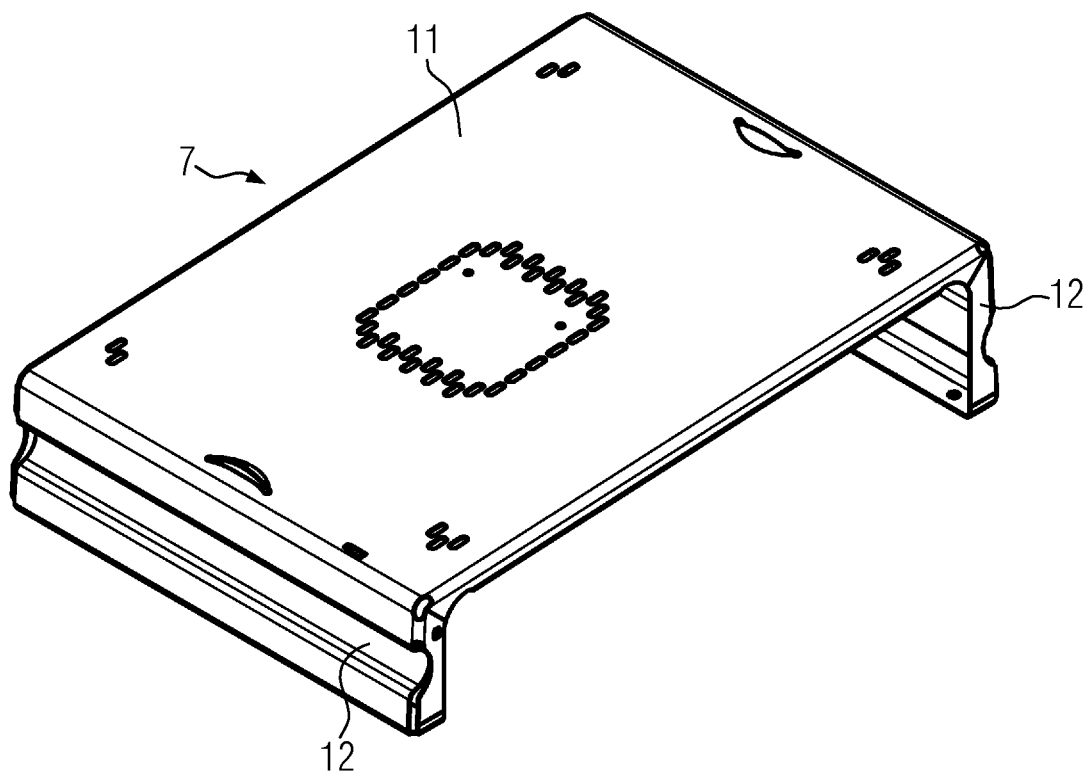
FIG. 2 is a perspective view of one embodiment of a protective cover in accordance with the teachings of the present disclosure.

FIG. 2 shows a perspective view of one of the protective covers 7. As in the case of the present embodiment, this protective cover 7 may have a lid 11. In addition, e.g. two sidewalls 12 may be provided, which provides spacing between the lid 11 and the package to be produced and/or the machine frame 2. This may, however, also be guaranteed by other devices, e.g. by an arcuate shape of the lid 11.

Figure 3A:
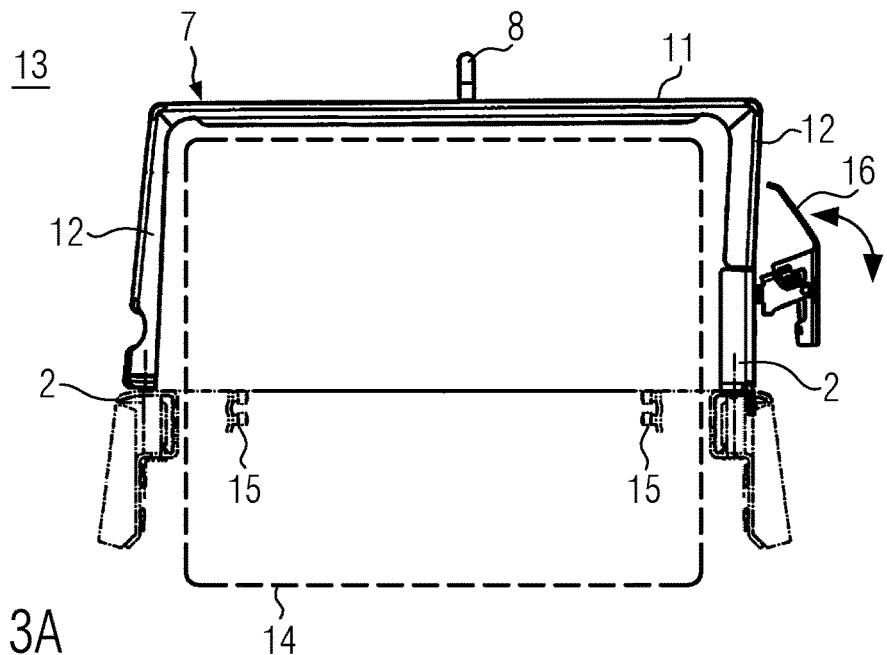
FIG. 3A is a sectional view of one embodiment of a protective cover of the packaging machine shown in FIG. 1 cut along the line III-III.

FIG. 3A shows a sectional view from the perspective indicated in FIG. 1 by the arrows identified by III. In this view, the protective cover 7 is arranged at a protective position 13. The broken line identifies an area of protection 14. Thus, it can clearly be seen that the area of protection 14 is, at least partially, shielded against access from outside the packaging machine 1 by the protective cover 7, as in the present embodiment. At those locations where the area of protection 14 is not shielded by the protective cover 7, it is shielded by the machine frame 2. In the area of protection 14, e.g. conveyor chains 15 may be arranged. Through the conveyor chains 15, a combination of films or a film having troughs formed therein can be conveyed. However, For the sake of clarity, these troughs are not shown in FIG. 3A. The machine frame 2 may have arranged thereon a locking lever 16, as in the present embodiment. The arrows indicate that the locking lever 16 may be supported on the machine frame 2 in a pivotable manner.

Figure 3B:
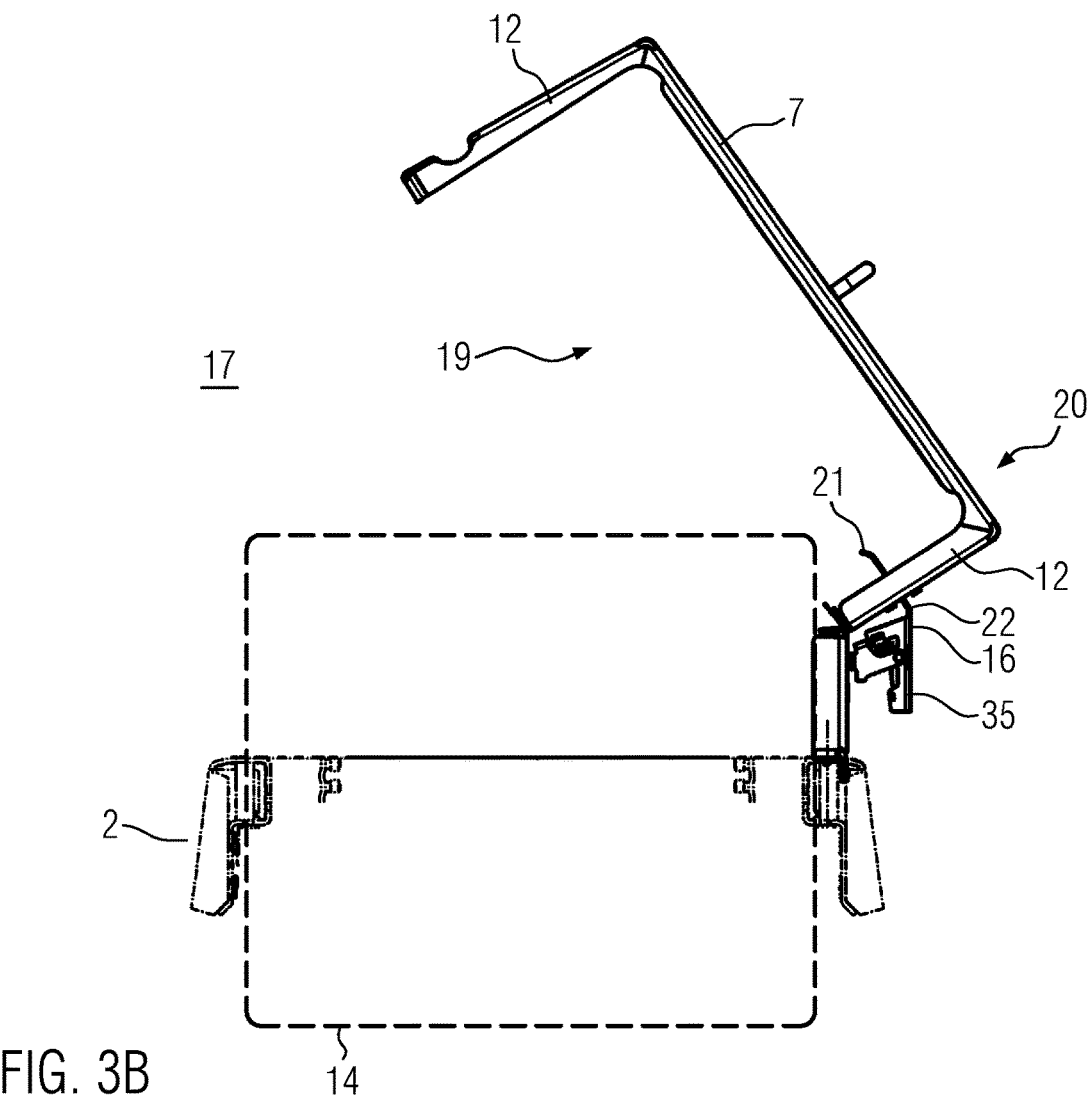
FIG. 3B is a sectional view of the protective cover of FIG. 3A showing the protective cover disposed in an access position.

The perspective of FIG. 3B corresponds to that of FIG. 3A. In FIG. 3B, however, the protective cover 7 is shown at an access position 17. To this end, the protective cover 7 may, as in the present embodiment, be configured to be pivotable about an axis 18 (cf. FIG. 4). It can be seen that the area of protection 14 has not moved together with the protective cover 7, since this area is defined with respect to the machine frame 2. By arranging the protective cover 7 at the access position, the area of protection 14 may be exposed, as in the present embodiment. In other words, when occupying the access position, the protective cover may allow access to the area of protection of the packaging machine.

An inner side 19 may be defined on the protective cover 7. This inner side 19 may especially be defined relative to the protective cover 7. In FIG. 3A, the inner side 19 is directed towards the area of protection 14. In FIG. 3B, it can be seen that, at the access position of the protective cover 7, the inner side 19 is not directed exclusively towards the area of protection 14. An outer side 20 of the protective cover 7 may be defined opposite the inner side 19. This outer side 20 is directed towards the surroundings of the packaging machine 1.

It can be seen that the locking lever 16 extends through the sidewall 12. A first portion 21 of the locking lever 16 may thus be arranged on the inner side 19 of the protective cover. A second portion 22 of the locking lever 16 may be arranged, at least partially, on the outer side 20 of the protective cover 7. This may allow an operator to access the locking lever 16 from the inner side 19 of the protective cover 7 as well as from the outer side 20 of the protective cover 7.

Figure 4:
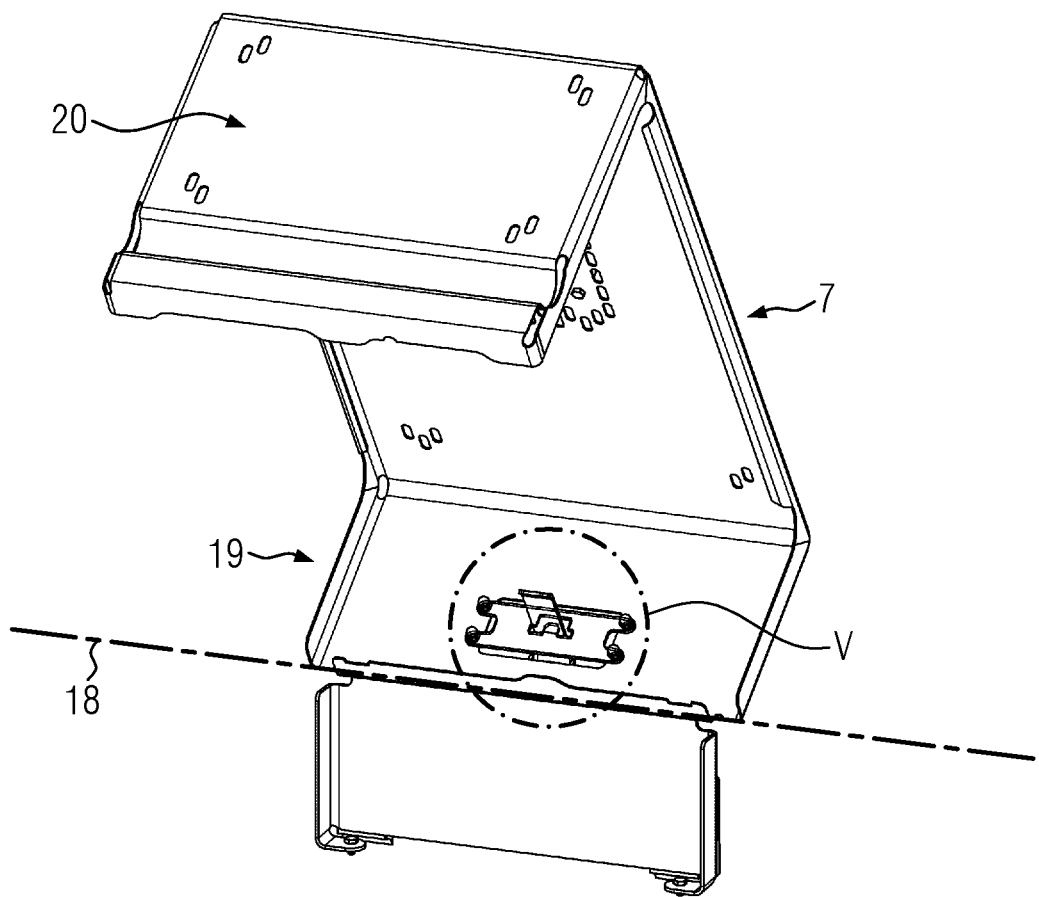
FIG. 4 is a perspective view of one embodiment of a protective cover in accordance with the teachings of the present disclosure wherein the protective cover is disposed in an access position.

In FIG. 4, the protective cover 7 is shown in a perspective representation. What can be seen is substantially the inner side 19. The area identified by V is shown in an enlarged representation in FIGS. 5A and 5B for explaining the engagement between the locking lever 16 and the protective cover 7 in more detail.

Figure 5A:
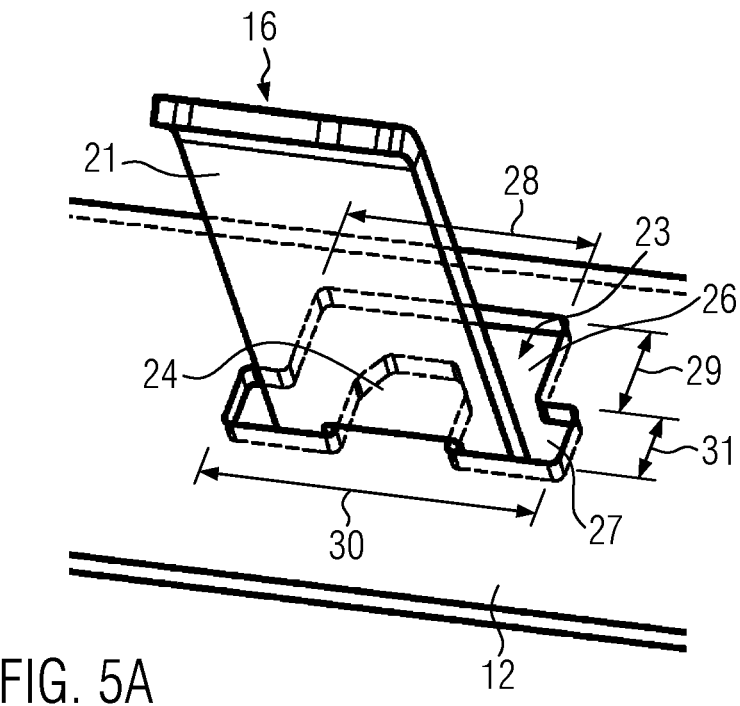
FIG. 5A is a blown up perspective detail view of a portion of the protective cover of FIG. 4 identified by label "V" showing one embodiment of a locking lever at a locking position.
Figure 5B:
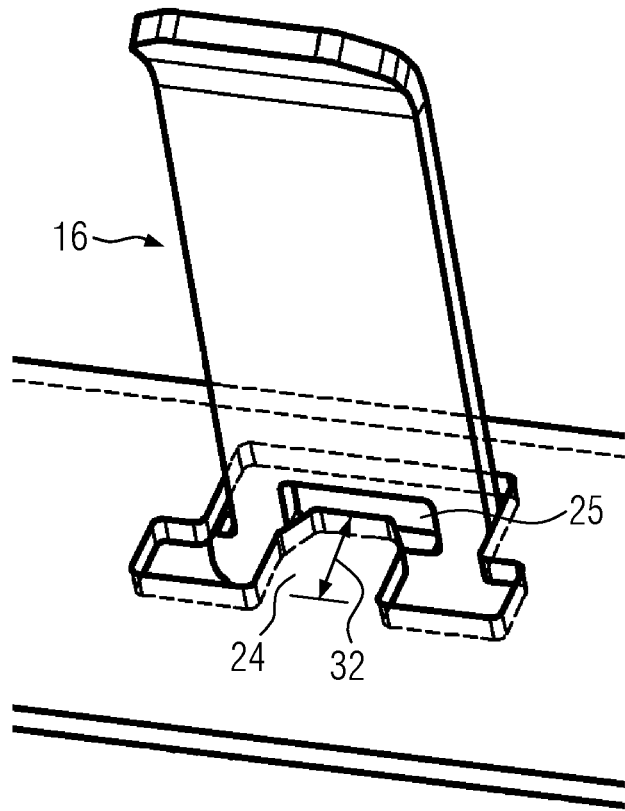
FIG. 5B is the blown up perspective detail of FIG. 5A showing the locking lever at a release position.

In FIG. 5A, the locking lever 16 is shown at a locking position. It extends through an opening 23, which is provided in the sidewall 12 in the present embodiment. This, however, should only be understood as an example. The opening 23 may be provided in any suitable wall of the protective cover 7. A projection 24 may extend into the opening 23, as in the present embodiment. At the locking position of the locking lever 16 shown in FIG. 5A, the projection 24 is in engagement with the locking lever 16. For this purpose, the locking lever 16 may have provided therein a locking opening 25 (cf. FIG. 5B). The opening 23 may comprise a first opening section 26 and a second opening section 27. The first opening section 26 may have a first internal width 28 and a first opening length 29. The second opening section 27 may have a second internal width 30 as well as a second opening length 31.

As in the case of the present embodiment, the first internal width 28 may be smaller than the second internal width 30. The projection 24 may extend substantially, preferably at least for a major part, particularly preferred for more than half in the second opening section. The extension in the direction of the two opening lengths 29, 31, which is shown in the present embodiment, is particularly advantageous. The projection 24 may have a length 32 (cf. FIG. 5B) that may be larger than the second opening length 31. The lengths referred to may here especially be measured at right angles to the widths referred to.

Figure 6:
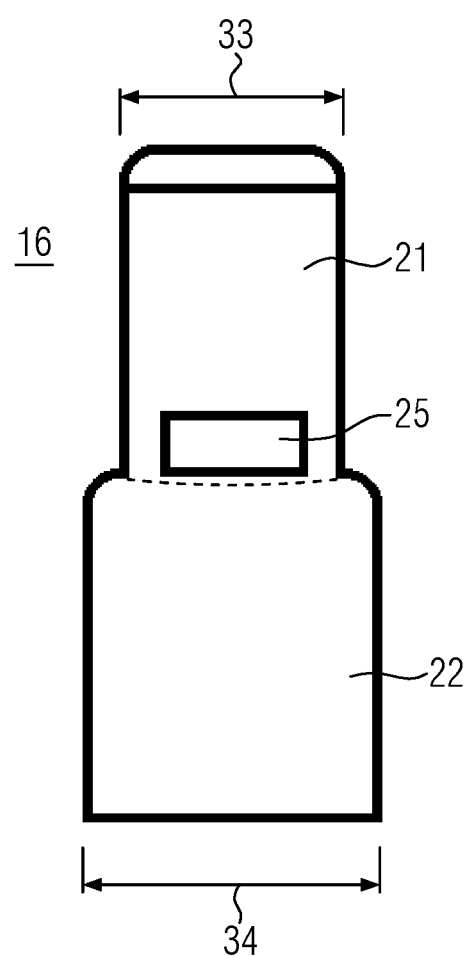
FIG. 6 is a schematic top view of one embodiment of a locking lever in accordance with the teachings of the present disclosure.

FIG. 6 shows a schematic representation of the locking lever 16 with the first portion 21 and the second portion 22. The boundary between these two portions is marked by a broken line. The first portion 21 may have a first width 33. The second portion 22 may have a second width 34. As in the case of the embodiment shown, the second width 34 may be larger than the first width 33. The first width 33 may especially be smaller than the first internal width 28 of the first opening section 26. Thus, the first portion 21 of the locking lever 16 may be passed through the opening 23, in particular through the first opening section 26. The second width 34 of the second portion 22 may especially be larger than the first internal width 28 of the first opening section 26. In this way, a stop may be provided.

As can be seen in FIG. 6, the locking opening 25 may be fully provided in the first portion 21. In particular, it may be provided close to the transition between the first portion 21 and the second portion 22. It will be particularly advantageous when, as in the present embodiment, the locking opening 25 is aligned with the projection 24, when the transition between the first portion 21 and the second portion 22 abuts on the sidewall 12 of the protective cover 7. When the projection 24 and the locking opening 25 are in alignment, the locking lever 16 may be moved from the release position shown in FIG. 5B to the locking position shown in FIG. 5A. In this way, the locking lever 16 and the projection 24 are brought into engagement and the protective cover 7 is locked at the access position.

According to a particularly preferred variant, the second width 34 of the second portion 22 may be smaller than the second internal width 30 of the second opening section 27. In this way, the locking lever 16 will be allowed to move further through the opening 23 until also part of the second portion 22 extends through the opening 23, in particular through the second opening section 27. Since the amount of play of the second portion 22 in the opening 23 is smaller than the length of the projection 24, the locking lever 16 cannot be moved to the release position unintentionally. The protective cover 7 can therefore only be unlocked when the locking lever 16 is manually acted upon intentionally.

An operator can move the locking lever 16 from the locking position to the release position in different ways. On the one hand, it is possible to move the locking lever 16 from the inner side 19 directly out of engagement with the projection 24. On the other hand, the locking lever 16 may be moved from the outer side 20 of the protective cover 7 to the release position by pressing a key 35 (cf. FIG. 3B). For this purpose, the locking lever 16, which is pivotably attached to the machine frame 2, may be pivoted by pressing the key 35. It is conceivable that the locking lever 16 is biased in the direction of the locking position, e.g. by means of a spring.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging machine comprising:
   a machine frame; and
   a protective cover moveable between a protective position and an access position,
   wherein at the protective position, the protective cover at least partially shields an area of protection of the packaging machine against access from outside the packaging machine, wherein the protective cover is fully removable from the machine frame and is lockable on the machine frame at the access position, and wherein the protective cover allows access to the area of protection of the packaging machine at the access position;
   wherein the machine frame includes a locking lever that is disposed on the machine frame for retaining the protective cover at the access position, wherein when the protective cover is disposed at the access position, the locking lever extends through a wall opening in a wall of the protective cover; and
   wherein the locking lever can be engaged with and disengaged from both an inner side and an outer side of the protective cover when the protective cover is disposed at the access position.

2. The packaging machine according to claim 1, wherein the locking lever is disposed fully outside the area of protection.

3. The packaging machine according to claim 1, wherein the protective cover is movable from the protective position to the access position by a pivotal movement about an axis of rotation.

4. The packaging machine according to claim 3, wherein the axis of rotation extends substantially parallel to a production direction of the packaging machine.

5. The packaging machine according to claim 1, further comprising a plurality of protective covers arranged in succession.

6. The packaging machine according to claim 5, wherein the plurality of protective covers are pivotable about a common axis.

7. The packaging machine according to claim 1, further comprising a plurality of protective covers arranged in succession along a production direction of the packaging machine.

8. The packaging machine according to claim 1, wherein the locking lever is pivotably supported on the machine frame.

9. The packaging machine according to claim 1, wherein the locking lever comprises a locking opening disposed for engagement with a projection of the protective cover, wherein the projection extends into the wall opening and the protective cover is retained at the access position through the engagement of the locking opening and the projection.

10. The packaging machine according to claim 9, wherein a first portion of the locking lever has a first width that is smaller than a second width of a second portion of the locking lever, wherein when the protective cover is at the access position, the first portion of the locking lever extends on an inner side of the protective cover and the second portion of the locking lever extends on an outer side of the protective cover.

11. The packaging machine according to claim 10, wherein the wall opening comprises a first opening section and a second opening section, the first opening section having a first internal width which is smaller than a second internal width of the second opening section.

12. The packaging machine according to claim 11, wherein the first width of the first portion of the locking lever is smaller than the first internal width of the first opening section of the wall opening, and the second width of the second portion of the locking lever is larger than the first internal width of the first opening section of the wall opening.

13. The packaging machine according to claim 12, wherein the second internal width of the second opening section of the wall opening is larger than the second width of the second portion of the locking lever.

14. The packaging machine according to claim 11, wherein a length of the projection is larger than an opening length of the second opening section.

15. A packaging machine comprising:
a machine frame; and
a protective cover moveable between a protective position and an access position,
wherein at the protective position, the protective cover at least partially shields an area of protection of the packaging machine against access from outside the packaging machine, wherein the protective cover is fully removable from the machine frame and is lockable on the machine frame at the access position, and wherein the protective cover allows access to the area of protection of the packaging machine at the access position;
wherein the machine frame includes a locking lever that is disposed on the machine frame for retaining the protective cover at the access position, wherein when the protective cover is disposed at the access position, the locking lever extends through a wall opening in a wall of the protective cover;
wherein the locking lever comprises a locking opening disposed for engagement with a projection of the protective cover, wherein the projection extends into the wall opening and the protective cover is retained at the access position through the engagement of the locking opening and the projection.

16. The packaging machine according to claim 15, wherein a first portion of the locking lever has a first width that is smaller than a second width of a second portion of the locking lever, wherein when the protective cover is at the access position, the first portion of the locking lever extends on an inner side of the protective cover and the second portion of the locking lever extends on an outer side of the protective cover.

17. The packaging machine according to claim 16, wherein the wall opening comprises a first opening section and a second opening section, the first opening section having a first internal width which is smaller than a second internal width of the second opening section.

18. The packaging machine according to claim 17, wherein the first width of the first portion of the locking lever is smaller than the first internal width of the first opening section of the wall opening, and the second width of the second portion of the locking lever is larger than the first internal width of the first opening section of the wall opening.

19. The packaging machine according to claim 18, wherein the second internal width of the second opening section of the wall opening is larger than the second width of the second portion of the locking lever.

20. The packaging machine according to claim 17, wherein a length of the projection is larger than an opening length of the second opening section.

* * * * *